US012752567B2

(12) United States Patent
Schinabeck et al.

(10) Patent No.: US 12,752,567 B2
(45) Date of Patent: Oct. 6, 2026

(54) TRANSFER SECURITY ELEMENT MATERIAL AND VALUE DOCUMENT COMPRISING A SECURITY ELEMENT

(71) Applicant: GIESECKE+DEVRIENT CURRENCY TECHNOLOGY GMBH, Munich (DE)

(72) Inventors: Josef Schinabeck, Kreuth (DE); Bjorn Teufel, Weissach (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 268 days.

(21) Appl. No.: 18/706,568

(22) PCT Filed: Sep. 15, 2022

(86) PCT No.: PCT/EP2022/025432
§ 371 (c)(1),
(2) Date: May 1, 2024

(87) PCT Pub. No.: WO2023/078582
PCT Pub. Date: May 11, 2023

(65) Prior Publication Data

US 2026/0152020 A1 Jun. 4, 2026

(30) Foreign Application Priority Data

Nov. 4, 2021 (DE) ..................... 10 2021 005 464.4
Apr. 25, 2022 (DE) ..................... 10 2022 001 403.3

(51) Int. Cl.
*B42D 15/00* (2006.01)
*B42D 25/346* (2014.01)
(Continued)

(52) U.S. Cl.
CPC ......... *B42D 25/346* (2014.10); *B42D 25/373* (2014.10)

(58) Field of Classification Search
CPC .... B42D 25/328; B42D 25/324; B42D 25/29; B42D 25/373; B42D 25/351; B42D 25/00
See application file for complete search history.

(56) References Cited

U.S. PATENT DOCUMENTS 4,163,570 A * 8/1979 Greenaway .......... G11B 7/0033 283/67
5,760,961 A * 6/1998 Tompkin ................ G06K 19/16 359/566
(Continued)

FOREIGN PATENT DOCUMENTS

DE 102012105342 A1 12/2013
DE 202017103832 U1 7/2017
(Continued)

OTHER PUBLICATIONS

German Search Report from corresponding DE Application No. 102022001403.3, Nov. 24, 2022.
(Continued)

*Primary Examiner* — Shin H Kim
(74) *Attorney, Agent, or Firm* — Workman Nydegger

(57) ABSTRACT

A transfer security element material has an intermediate carrier and a plurality of security elements for value documents. The security elements are arranged on the intermediate carrier and are detachable from the intermediate carrier and permanently transferred to a value document substrate upon their transfer. The security elements are present on the intermediate carrier separated from one another at least by transfer predetermined breaking points as separately transferable security elements. The security elements have separation protection predetermined breaking points not arranged parallel to the transfer predetermined breaking
(Continued)

points, which are to obstruct a separation of the transferred security element from the value document substrate without destroying the security element. The security elements include a central decorative area and a transparent edge area surrounding the decorative area, and the separation protection predetermined breaking points are formed in the transparent edge area without extending into the decorative area.

15 Claims, 7 Drawing Sheets

(51) Int. Cl.

| | |
|---|---|
| ***B42D 25/373*** | (2014.01) |
| ***G02B 5/18*** | (2006.01) |

(56) References Cited

U.S. PATENT DOCUMENTS 6,060,143 A * 5/2000 Tompkin .......... G06K 19/06046 428/209
7,390,556 B2 * 6/2008 Lazzerini ............. B42D 25/355 428/209
8,534,708 B2 * 9/2013 Heim ................... B42D 25/351 283/89
8,964,296 B2 * 2/2015 Hoffmuller .......... B42D 25/328 359/619
9,459,385 B2 * 10/2016 Brehm ................... B42D 25/29
11,807,029 B2 * 11/2023 Rauch .................. B42D 25/324
2008/0239216 A1 * 10/2008 Miyamoto ........... B42D 25/328 349/113
2008/0258456 A1 * 10/2008 Rahm .................... B42D 25/29 283/85
2008/0299464 A1 12/2008 Eto et al.
2010/0194091 A1 * 8/2010 Heim ..................... B42D 25/21 264/293
2011/0115212 A1 * 5/2011 Hoffmuller ............ G03H 1/028 156/538
2011/0127762 A1 * 6/2011 Hoffmuller ........... B44C 1/1704 156/247
2015/0352887 A1 * 12/2015 Holmes .................. B42D 25/36 427/7
2016/0023495 A1 * 1/2016 Fuhse .................. B42D 25/328 359/566
2021/0031553 A1 * 2/2021 Brehm ................. B42D 25/324
2022/0153054 A1 * 5/2022 Pfeiffer .................. B42D 25/29

FOREIGN PATENT DOCUMENTS

DE 102017113787 A1 12/2018
JP 2000284673 A 10/2000
JP 2008134481 A 6/2008
WO 2009127325 A1 10/2009
WO 2010031543 A1 3/2010

OTHER PUBLICATIONS

International Search Report from corresponding PCT Application No. PCT/EP2022/025432, Feb. 8, 2023.

* cited by examiner

TRANSFER SECURITY ELEMENT MATERIAL AND VALUE DOCUMENT COMPRISING A SECURITY ELEMENT

FIELD OF INVENTION

The invention relates to a transfer security element material, a method for producing a transfer security element material, the use of a transfer security element material for producing value documents comprising security elements, and a value document comprising a security element.

BACKGROUND

Providing value documents, such as banknotes, with security elements in order to protect the value documents from copying or forgery is known. Using a transfer material for transferring security elements to value documents is known. A security element to be transferred to the value document can be provided on an intermediate carrier. In order to transfer the security element to the value document, the security element is detached from the intermediate carrier and transferred to the value document.

WO 2010/031543 A1 relates to a security element transfer material which has a security element layer composite and a temporary carrier. The security element layer composite has a large number of layers, which include at least one feature layer, a permanent carrier substrate, and a viewing layer, wherein the viewing layer is the layer which faces toward an observer after the transfer of a security element to a value object, and wherein the viewing layer can be identical to a feature layer or the permanent carrier substrate. The temporary carrier is separably connected to the viewing layer of the security element layer composite and has a carrier layer composite which consists of a first and a second temporary carrier substrate that are non-detachably adhesively bonded by means of an adhesive layer.

In order to prevent a security element from being removed from one value document and being applied to another value document, providing the security element with weakening lines is known. The security element tears upon an attempt at removal due to the weakening lines and cannot be applied intact to the other value document.

WO 2009/127325 A1 relates to a method for producing a security or value document, comprising the following method steps: providing a layer composite made up of at least one paper substrate, which is provided in a marking area with a laser-modifiable marking material, and a security element, which is present in the marking area and can be weakened by laser action, and applying laser radiation to the layer composite, in order to create simultaneous and precisely fitted weakening lines in the security element and, by modification of the marking material, marks in the paper substrate.

SUMMARY

It is an object of the invention to specify a transfer security element material by which a security element can be transferred cost-effectively and easily to a value document substrate. The security element is to ensure a high level of security from forgery and is to be visually appealing.

A transfer security element material comprises an intermediate carrier and a plurality of security elements for value documents. The security elements are arranged on the intermediate carrier so they are detachable from the intermediate carrier, in order to be detached from the intermediate carrier and permanently transferred to a value document substrate upon their transfer. The security elements are present on the intermediate carrier separated from one another at least by transfer predetermined breaking points as separately transferable security elements. The security elements comprise separation protection predetermined breaking points not arranged parallel to the transfer predetermined breaking points, which are to obstruct a separation of the transferred security element from the value document substrate without destroying the security element. The security elements comprise a central decorative area and a transparent edge area surrounding the decorative area. The separation protection predetermined breaking points are formed in the transparent edge area without extending into the decorative area.

The security from forgery of a value document having the security element may be increased, while the security element is visually appealing, by the separation protection predetermined breaking points not arranged in parallel in the transparent edge area of the respective security element. The decorative area is not impaired by the separation protection predetermined breaking point. The nonparallel arrangement of the separation protection predetermined breaking points does allow the security element to tear or be destroyed upon an attempt at removal, and this is also the case for attempts at removal in different removal directions.

The transfer security element material can be provided as a film having a plurality of security elements. The film can be provided as a roll, for example. At least ten, preferably at least fifty security elements can be present on the transfer security element material.

The security elements can convey an optical impression to an observer (a human) without aids, so that the observer can visually perceive the authenticity of the object provided with the security element without aids. A visual security element is particularly suitable for simple or everyday authenticity checks by a human. The optical impression can be perceptible in a wave-length range of 400 nm to 780 nm.

The security elements can be optically variable security elements. In an optically variable security element, different optical impressions result for the observer who wishes to carry out an authenticity check depending on the observation angle, the observation direction, the side of the security element, or the type of the observation (top view or through view).

The security element can be applied to the object to be secured, such as a banknote or a precursor of a banknote, for example, as a patch or strip. The security element can be designed as planar. The area of the security element can be at most 5000 $mm^2$, preferably at most 2500 $mm^2$, more preferably at most 1500 $mm^2$, more preferably at most 1000 $mm^2$.

The security element can have a length at least five times greater, preferably at least 10 times greater than the width. The security element can have a width of at least 1 mm.

The security element can be provided as a thread, as a strip, or as a patch.

A value document substrate can be a precursor of a value document. A value document substrate can be a paper which is not yet completely printed. A value document substrate can comprise at least one security element, at least one window, and/or at least one security feature.

The security element can be applied to a value document or a value document substrate. The security element can extend from one side of the value document or the value document substrate to another side of the value document or the value document substrate. The sides can be opposing sides. The security element can have a length which is equal to the width or height of the value document or the value document substrate.

The security element can be at least partially introduced into the value document or into the value document substrate. The security element can be introduced into the value document or the value document substrate so that sections of the security element are visible by an observer and sections of the security element are not visible by the observer. The security element can be introduced into the value document or the value document substrate so that sections of the security element are covered by the value document or the value document substrate and sections of the security element are not covered by the value document or the value document substrate.

In general, security elements can be applied to an object to enable the authenticity of the value document to be checked. A value document can be, for example, a check, a bank card, a document, a deed, an identification card, a piece of clothing (a label of a piece of clothing), or a banknote.

A predetermined breaking point can be a material weakening. For example, the thickness of the transfer security element material or the security element can be less in the area of a predetermined breaking point than in an area in which no predetermined breaking point is located. A lesser mechanical strength (for example, lesser tear resistance) of the transfer security element material or the security element can also be present in the area of a predetermined breaking point than in an area in which no predetermined breaking point is located.

A transfer predetermined breaking point can be a predetermined breaking point for transferring the security element to a value document. The transfer can be facilitated by the transfer predetermined breaking point. At least one transfer predetermined breaking point, for example, one (or multiple) circumferential transfer predetermined breaking point (s) or multiple transfer predetermined breaking points delimiting the security element, and multiple separation protection predetermined breaking points are provided for each security element.

A separation protection predetermined breaking point can be a predetermined breaking point which obstructs or even prevents detaching an intact security element from a value document. It can be ensured by the separation protection predetermined breaking point that the security element is destroyed, tears, or becomes unusable upon being detached from a value document. A destroyed, torn, or unusable security element can be recognized as improper by a user.

Security elements are arranged on the intermediate carrier of the transfer security element material. The security elements can be removed from the intermediate carrier to transfer them to a value document or a value document substrate. The intermediate carrier can comprise or be a film or a composite film. In particular, the intermediate carrier comprises a plastic film, such as a PET film (polyethylene terephthalate film). The intermediate carrier can comprise two plastic films, such as two PET films. The two plastic films can be adhesively bonded to one another.

The separation protection predetermined breaking points are not arranged parallel to the transfer predetermined breaking points. The separation protection predetermined breaking points can be nonparallel to the transfer predetermined breaking points in a plane defined by the transfer security element material. The plane can be defined by the surface of the transfer security element material, in particular by the surface which has the separation protection predetermined breaking points.

An angle not equal to 0° and/or 180° can be formed between the separation protection pre-determined breaking points and the transfer predetermined breaking points. An angle between the separation protection predetermined breaking points and the transfer predetermined breaking points can be between 1° and 179°.

Preferably, all separation protection predetermined breaking points are nonparallel to all transfer predetermined breaking points. In other words, no separation protection predetermined breaking point of the security element can be parallel to a transfer predetermined breaking point of the security element. The angle between at least one (or all) separation protection predetermined breaking points of the security element and the at least one transfer predetermined breaking point of the security element is preferably in the range 90+/−45°, more preferably in the range 90+/−30°, and particularly preferably in the range 90+/−20°. The angle is measured here in the plane of the security element or the transfer security element material. For example, for curved or other nonlinear predetermined breaking points, an average orientation of the predetermined breaking point(s) is used to determine the angle.

The security elements comprise a decorative area and a transparent edge area. The decorative area can be an area which provides an optical effect for the user for checking the authenticity of the security element. The transparent edge area can be an area which does not provide an optical effect for checking the authenticity of the security element.

No distance can be present between the decorative area and the edge area. The edge area can directly or immediately adjoin the decorative area. The edge area can contact the decorative area.

The transfer security material can comprise a plastic film, in particular a PET film. The security element preferably comprises a plastic film, in particular a PET film.

A distance between at least one of the separation protection predetermined breaking points of the security element and at least one of the transfer predetermined breaking points of the security element can be less than 100 μm. The distance is preferably equal to zero. More preferably, a majority of the or each of the separation protection predetermined breaking points is arranged in the transparent edge area of the security element at the distance (less than 100 μm or zero).

At least one of the separation protection predetermined breaking points, preferably the majority of the separation protection predetermined breaking points or more preferably each of the separation protection predetermined breaking points, can extend in the transparent edge area with less than 92%, and preferably more than 15%, over a width of the transparent edge area. The extension over the width of the transparent edge area, which could also be viewed as the relative length of the separation protection predetermined breaking points in the direction of the width of the transparent edge area, is particularly preferably more than 30% and less than 85%.

For at least one of the, the majority of the, or each of the separation protection predetermined breaking points, a distance to the decorative area (or its edge) can be at least 100 μm, preferably at least 250 μm, and more preferably 400 μm. The distance between at least one of the separation protection predetermined breaking points and the decorative area can be a distance between at least one of the separation protection predetermined breaking points and an edge of the decorative area. The distance can be designated as the smallest distance.

The transparent edge area can have a width of at least 500 µm, preferably of 500 µm to 3.0 mm. The width can be constant or variable. If the width is variable, the width can be understood as the minimum width. The width of the transparent edge area can be a distance between the edge of the decorative area and the transfer predetermined breaking point(s).

In general, a distance or a width can be present or measured in a plane defined by the transfer security element material. The distance or the width is preferably present in an (outer) surface of the transfer security element material or is measured there.

The transfer security element material can comprise an effect layer. In particular, the effect layer comprises a metallization and/or a demetallization and/or an arrangement of micro-reflectors (micromirrors). The security element can comprise the effect layer. The effect layer can define the decorative area. The effect layer can (largely) define an optical effect of the decorative area.

The decorative area may comprise the effect layer. Additionally or alternatively, the transparent edge area may not comprise the effect layer. The effect layer may exclusively be arranged or present in the decorative area.

At least one of the separation protection predetermined breaking points, preferably each of the separation protection predetermined breaking points can be linear, circular, triangular, quadrilateral, or n-polygonal. In particular, at least one of the separation protection predetermined breaking points, preferably some or each of the separation protection predetermined breaking points, is linear, circular, triangular, quadrilateral, or n-polygonal in a plane defined by the transfer security element material. The plane can be an (outer) surface of the transfer security element material.

The transfer security element material can comprise a transfer layer. The intermediate carrier can be detachably connected to the transfer layer by an adhesive layer. In particular, the transfer layer is a multilayer transfer layer.

The transfer predetermined breaking points can extend through the entire transfer layer. Additionally or alternatively, the transfer predetermined breaking points can at most extend partially through the intermediate carrier.

The separation protection predetermined breaking points can extend through the entire transfer layer. Additionally or alternatively, the separation protection predetermined breaking points can at most extend partially through the transfer layer. Additionally or alternatively, at least two of the separation protection predetermined breaking points can extend by different amounts into the transfer layer. The respective extension can be oriented perpendicular to a plane defined by the transfer security element material, in particular perpendicular to an (outer) surface of the transfer security element material. The separation protection predetermined breaking points can extend essentially (±10% or ±5%) perpendicularly to an (outer) surface of the transfer security element material.

Different separation protection predetermined breaking points can extend by different amounts into the transfer layer.

A method for producing a transfer security element material comprises the following steps: providing a transfer security element material precursor; and introducing transfer predetermined breaking points and separation protection predetermined breaking points into the transfer security element material precursor, by which the transfer security element material is obtained.

Each transfer security element material disclosed herein can be produced in the method.

A transfer security element material precursor can be a transfer security element material which is not yet completely finished. Further work steps can be necessary to produce or manufacture a transfer security element material from a transfer security element material precursor.

The transfer predetermined breaking points and the separation protection predetermined breaking points can be introduced into the transfer security element material precursor in the same work step. The transfer predetermined breaking point(s) and the separation protection pre-determined breaking points of a security element are therefore preferably also introduced essentially simultaneously and/or precisely located in relation to one another into the transfer security element material precursor.

The transfer predetermined breaking points and the separation protection predetermined breaking points could alternatively be introduced into the transfer security element material pre-cursor in different work steps, for example, in succession in one machine or in multiple machines in succession. The different work steps take place at time intervals, for example, at intervals of at least 1.0 s to 10 s in a machine or chronologically independently (thus at an interval of minutes, hours, or days).

The transfer predetermined breaking points and/or the separation protection predetermined breaking points can be produced by stamping, embossing, and/or by laser processing (as a work step).

The use of a transfer security element material disclosed herein for producing value documents having security elements is disclosed.

The transfer security element material can be used to produce a value document having a security element. The value document can comprise a value document substrate and a security element arranged on the value document substrate.

Furthermore, a value document having a security element transferred from a transfer security element material disclosed herein is disclosed.

A value document can comprise each security element disclosed herein.

BRIEF DESCRIPTION OF THE DRAWINGS

Further exemplary embodiments and advantages of the invention are explained hereinafter on the basis of the figures, the representation of which has omitted a reproduction to scale and in proportion in order to enhance the visibility.

In the figures.

DETAILED DESCRIPTION OF VARIOUS EMBODIMENTS

Figure 1:
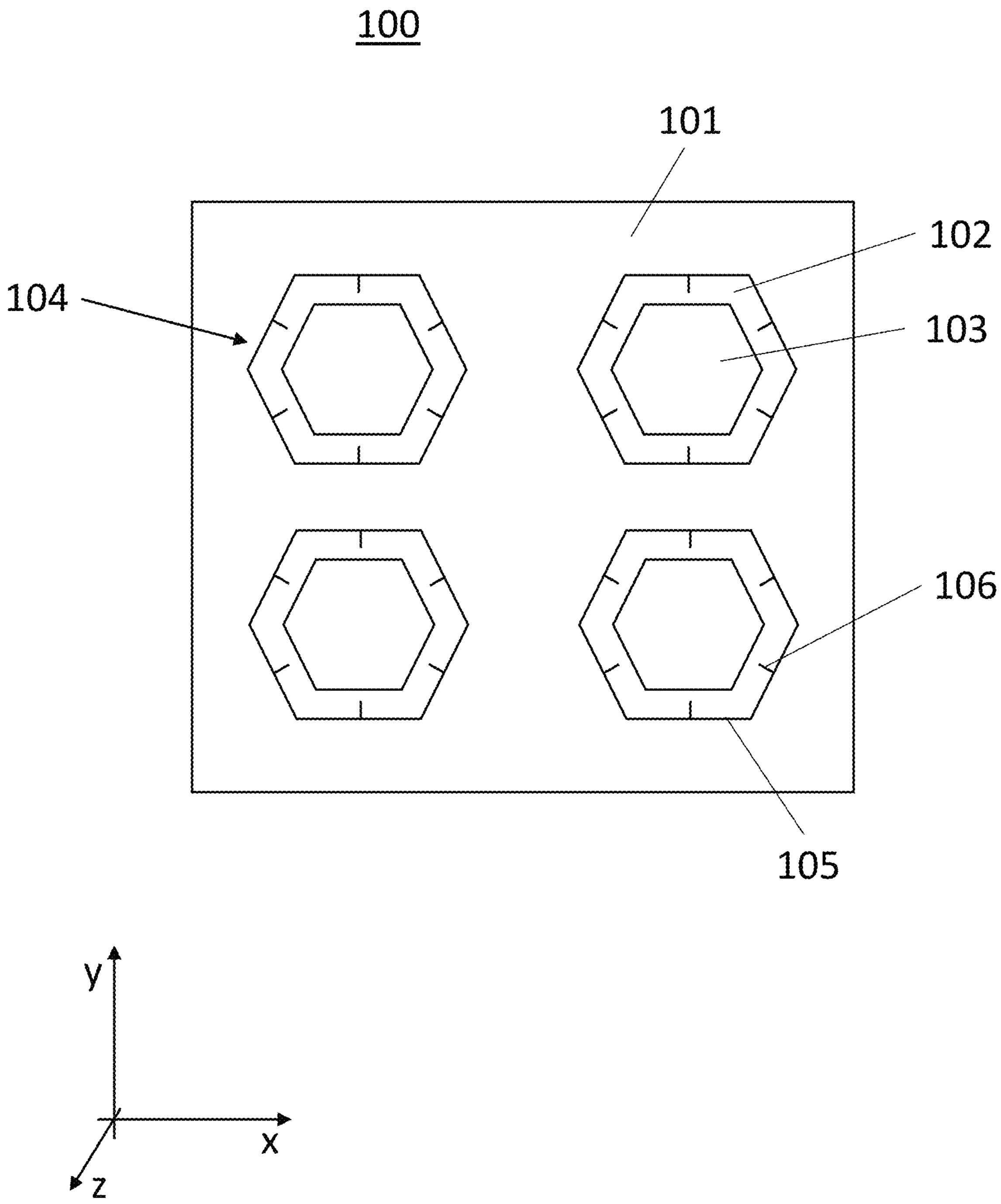
FIG. 1 schematically shows an embodiment of a transfer security element material 100, FIG. 2 schematically shows a further embodiment of a transfer security element material 100, FIG. 3 schematically shows a layer structure of a transfer security element material 100, FIG. 4 schematically shows a layer structure of a security element 104, FIG. 5 schematically shows a layer structure of a transfer security element material 100, FIG. 6 schematically shows a layer structure of a transfer security element material 100.

FIG. 1 shows a transfer security element material 100 in a top view. The transfer security element material 100 has a surface 101. Multiple security elements 104 are formed in the transfer security element material 100.

The transfer security element material 100 can define an x-y plane. In particular, the surface 101 of the transfer security element material 100 defines the x-y plane. The transfer predetermined breaking points 105 and the separation protection predetermined breaking points 106 can be formed in the surface 101. A z direction can be oriented perpendicular to the x-y plane.

The security elements 104 have a decorative area 103 and a transparent edge area 102. The transparent edge area 102 surrounds the decorative area 103.

The transfer security element material 100 comprises transfer predetermined breaking points 105 and separation protection predetermined breaking points 106. In particular, the security elements 104 of the transfer security element material 100 comprise transfer predetermined breaking points 105 and separation protection predetermined breaking points 106.

(Precisely) one transfer predetermined breaking point 106 can be provided per security element 104. The transfer predetermined breaking point 106 can completely enclose or surround the security element 104.

Multiple separation protection predetermined breaking points 106 can be provided per security element 104. The separation protection predetermined breaking points 106 are not parallel to the transfer predetermined breaking points 105 or to the transfer predetermined breaking point 105. None of the separation protection predetermined breaking points 106 can be parallel to a transfer predetermined breaking point 105 of the associated security element 104. In particular, none of the separation protection predetermined breaking points 106 is parallel to a section of a transfer predetermined breaking point 105 of the associated security element 104.

In the embodiment of FIG. 1, the separation protection predetermined breaking points 106 are spaced apart from the decorative area 103. A distance between the separation protection predetermined breaking points 106 and the transfer predetermined breaking point 105 of a respective security element 104 is equal to zero. In other words, the separation protection predetermined breaking points 106 contact the transfer predetermined breaking point 105. The separation protection predetermined breaking points 106 do not contact the decorative area 103.

The transfer predetermined breaking point 105 of a security element 104 can also be understood as the edge of the security element 104.

Figure 2:
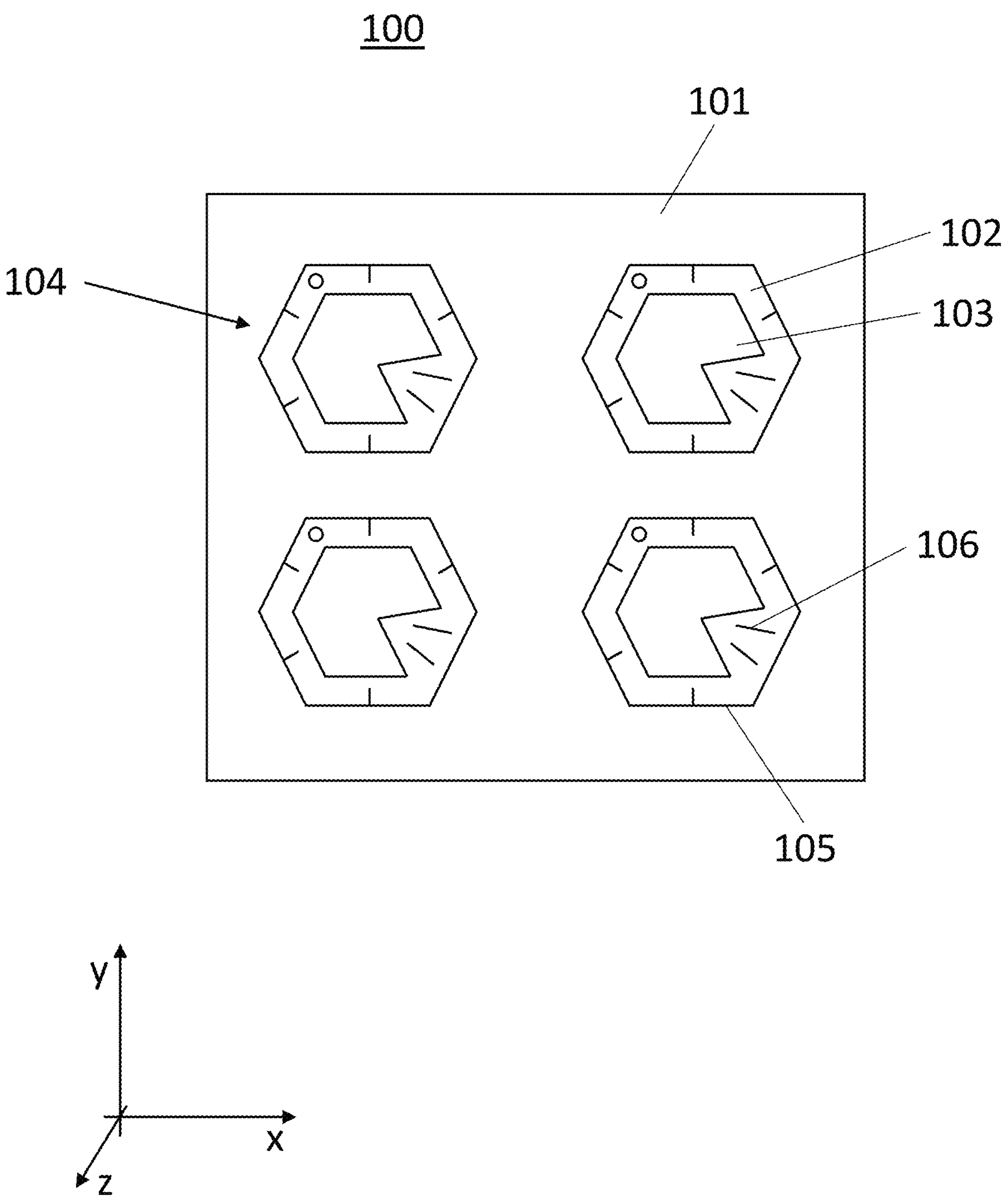

The transfer security element material 100 of FIG. 2 comprises, similarly to the transfer security element material 100 of FIG. 1, a surface 101 and security elements 104. A decorative area 103 and a transparent edge area 102 surrounding it are provided in the transfer security element material 100.

The transfer security element material 100 or the security elements 104 of the transfer security element material 100 comprise transfer predetermined breaking points 105 and separation protection predetermined breaking points 106.

In general, the separation protection predetermined breaking points 106 can have any geometric shape, in particular in the surface 101 of the transfer security element material 100. Preferably, the separation protection predetermined breaking points 106 are linear, circular, triangular, quadrilateral, or n-polygonal.

In the embodiment of FIG. 2, the separation protection predetermined breaking points 106 have different shapes. At least one of the separation protection predetermined breaking points 106 can be circular and at least one of the separation protection predetermined breaking points 106 can be linear. Linear separation protection predetermined breaking points 106 can have different lengths.

Some of the separation protection predetermined breaking points 106 may contact the transfer predetermined breaking point 105 of a respective security element 104, while some other separation protection predetermined breaking points 106 may not contact the transfer predetermined breaking point 105 of a respective security element 104.

All of the separation protection predetermined breaking points 106 or at most some of the separation protection predetermined breaking points 106 can be spaced apart from the decorative area 103.

The transparent edge area 102 can have a constant width (see FIG. 1) or can have a variable width (see FIG. 2).

Layer structures of the transfer security element material 100 are shown in FIGS. 3 to 7, wherein identical layers may only be described once, but may be found again identically or similarly in the other transfer security element materials 100. The layer structures are shown schematically as a section perpendicular to the surface 101 of the transfer security element material 100.

The transfer security element material 100 comprises an intermediate carrier 300. The intermediate carrier 300 can comprise a first plastic film 190. The intermediate carrier 300 can comprise a second plastic film 180. Each of the plastic films 180, 190 can be a PET film. The thickness of each of the plastic films 180, 190 can be less than 50 μm or less than 20 μm. The plastic films 180, 190 can be (permanently) connected to one another by an adhesive layer 185.

The transfer security element material 100 has a transfer layer 200. The transfer layer 200 is detachably arranged on the intermediate carrier 300. In particular, it can be detachably connected to the intermediate carrier 300 by an adhesive layer 170. The adhesive layer 170 can insofar also be designated as a temporary or release adhesive layer. The adhesive layer 170 enables the transfer layer 200 (with and/or without the adhesive layer 170) to be detached from the intermediate carrier 300. The adhesive layer 170 is preferably also transferred onto the value document substrate, but could also remain on the intermediate carrier 300. When the adhesive layer 170 is also transferred to the value document substrate, it is particularly preferably adapted to be used as a printing acceptance layer. The adhesive layer 170 can preferably be printed.

The transfer layer 200 can comprise a lamination adhesive layer 160, which can be arranged on the adhesive layer 170.

The transfer layer 200 can comprise a plastic film 150, such as a PET film. The plastic film 150 can be arranged on the lamination adhesive layer 160.

The transfer layer 200 can comprise a (further) lamination adhesive layer 140. The lamination adhesive layer 140 can be arranged on the plastic film 150.

The transfer layer 200 can comprise an effect layer 130. The effect layer 130 can be arranged on the lamination adhesive layer 140. The effect layer 130 can comprise a metallization and/or demetallization and/or an arrangement of micro-reflectors (micromirrors). The effect layer 130 can define the decorative area 103 (indicated by the dashed lines). The effect layer 130 may be interrupted or may not extend completely over the surface of the transfer security element material 100. An optical effect of the security element 104 for the user can be provided by the effect layer 130.

The transfer layer 200 can comprise a lacquer layer 120. The lacquer layer 120 can be arranged on the effect layer 130. The lacquer layer 120 can be an embossed lacquer layer, for example, a radiation-cured lacquer.

The transfer layer 200 can comprise an adhesive layer 110. The adhesive layer 110 can be arranged on the lacquer layer 120. The security element 104 (as part of the transfer layer 200) can be fastened on a value document 500 by the adhesive layer 110. The adhesive layer 110 can be, for example, a hot seal lacquer layer and can optionally comprise a primer layer arranged below the hot seal lacquer layer.

The transparent edge area 102 is formed between the decorative area 103 and the transfer predetermined breaking points 105 or the transfer predetermined breaking point 105.

It is preferred for the transfer predetermined breaking points 105 or the transfer predetermined breaking point 105 to extend completely through the transfer layer 200. In particular, the transfer predetermined breaking points 105 or the transfer predetermined breaking point 105 does not extend completely (or at most partially) through the intermediate layer 300. A transfer of a security element 104 is thus facilitated.

The separation protection predetermined breaking points 106 can extend by different depths or widths into the transfer security element material 100. The separation protection predetermined breaking points 106 can extend at most partially into the transfer layer 200. Therefore, the separation protection predetermined breaking points 106 cannot be visible to the observer on the target substrate after the transfer. The separation protection predetermined breaking points 106 may not extend completely through the transfer layer in this case.

It is preferred for at least one or a few of the separation protection predetermined breaking points 106 to extend into the plastic film 150 or through the plastic film 150. The plastic film 150 can thus be initially torn and the plastic film 150 can tear further and become unusable if an attempt is made to detach the security element 104 from the value document 500.

The separation protection predetermined breaking points 106 may not extend into the intermediate carrier 300 or through the intermediate carrier 300.

Figure 4:
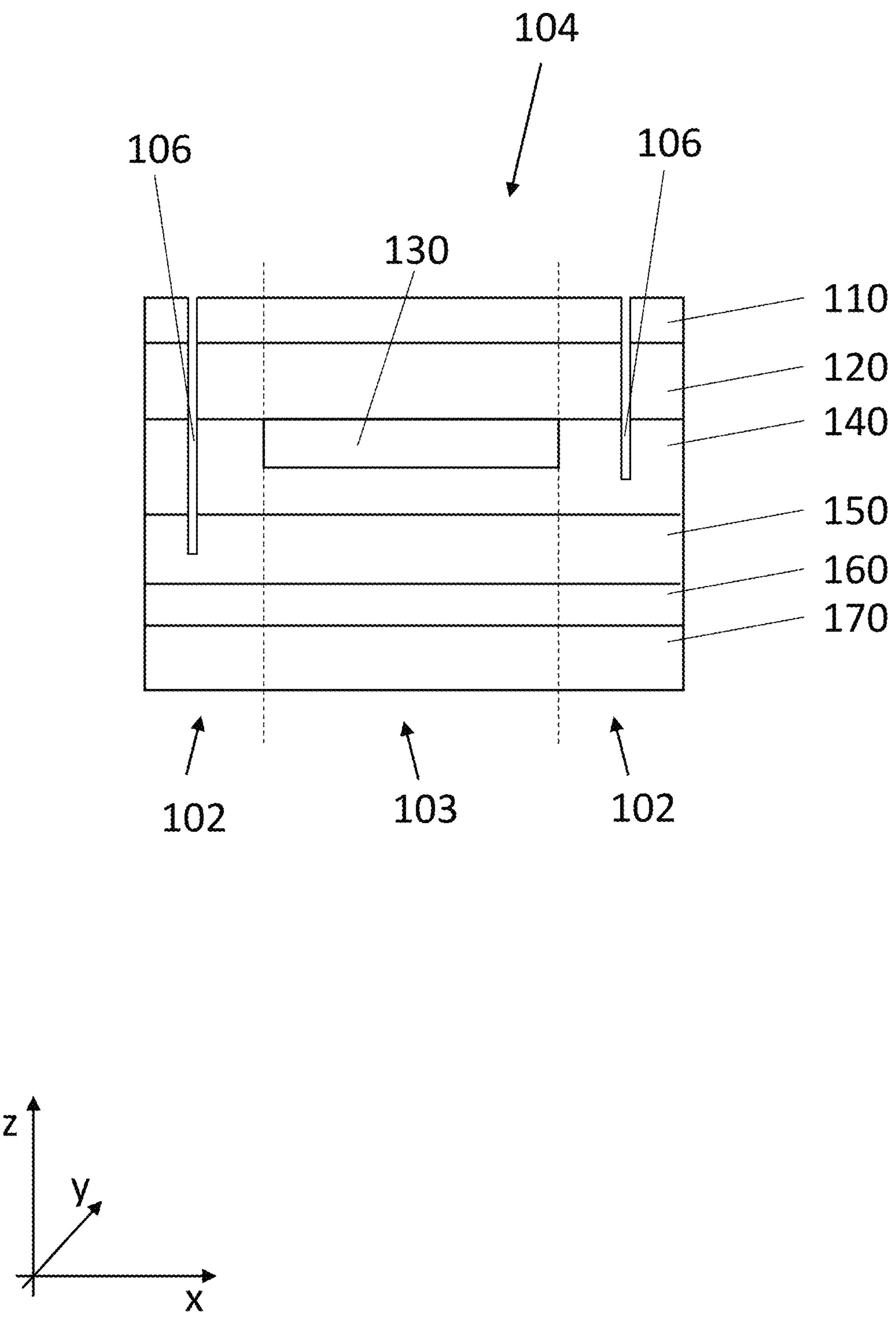

FIG. 4 shows a security element 104 which is detached from the intermediate carrier 300. The security element 104 can comprise the described layers 110, 120, 130, 140, 150, 160, and/or 170.

If the security element 104 is applied to the value document 500, the separation protection predetermined breaking points 106 are located in the transparent edge area 102. The optical impression of the decorative area 103 is thus not disturbed. The value document substrate 500 which abuts the adhesive layer 110 is not shown in FIG. 4.

The application can take place in that the adhesive layer 110 is contacted with a surface of the value document and adheres there. A connection between the transfer layer 200 and the intermediate carrier 300 can be detached or broken for this purpose. In particular, the connection is detached or broken at the adhesive layer 170. The adhesive layer 170 could alternatively remain entirely or partially on the intermediate carrier.

Figure 3:
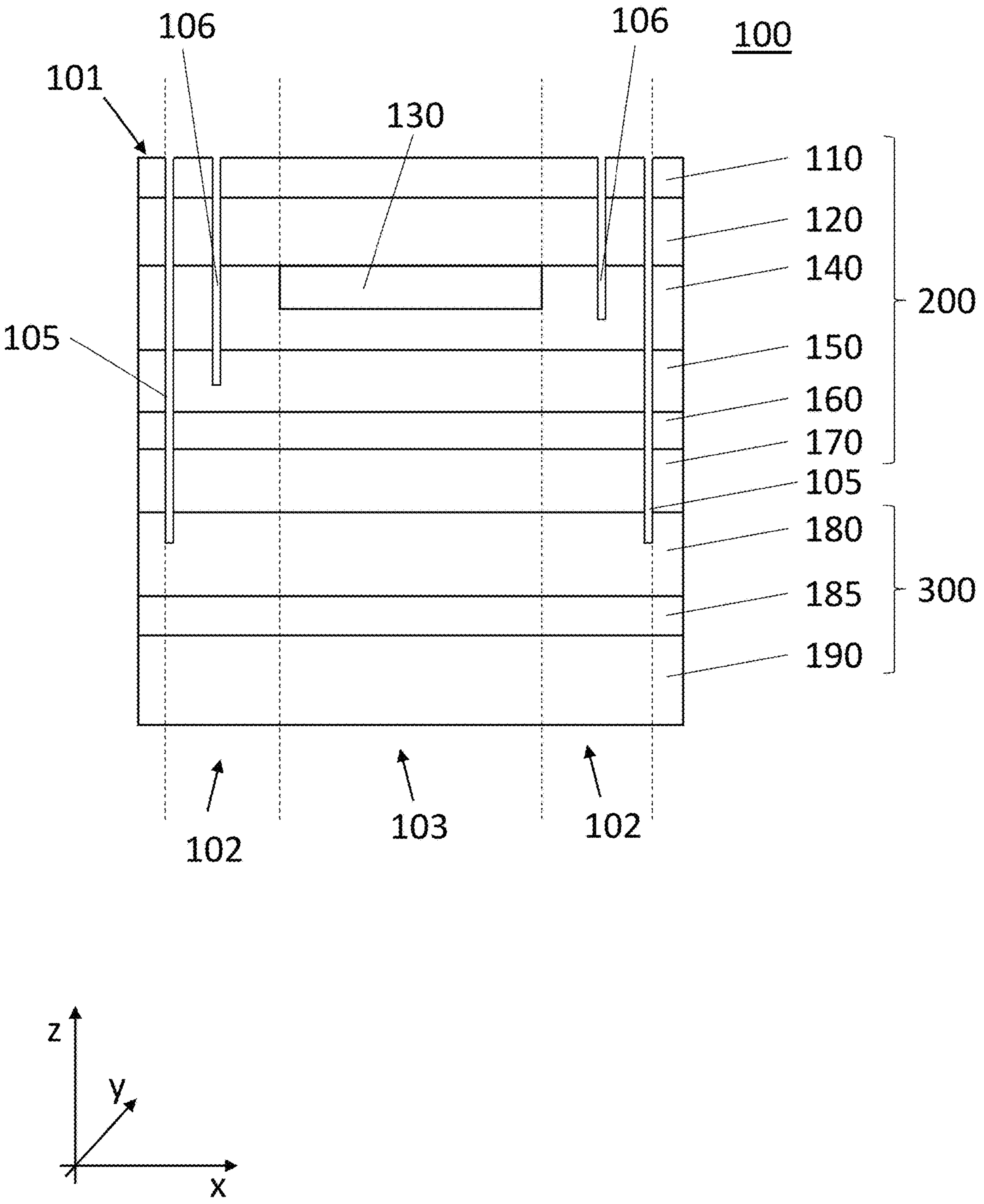
Figure 5:
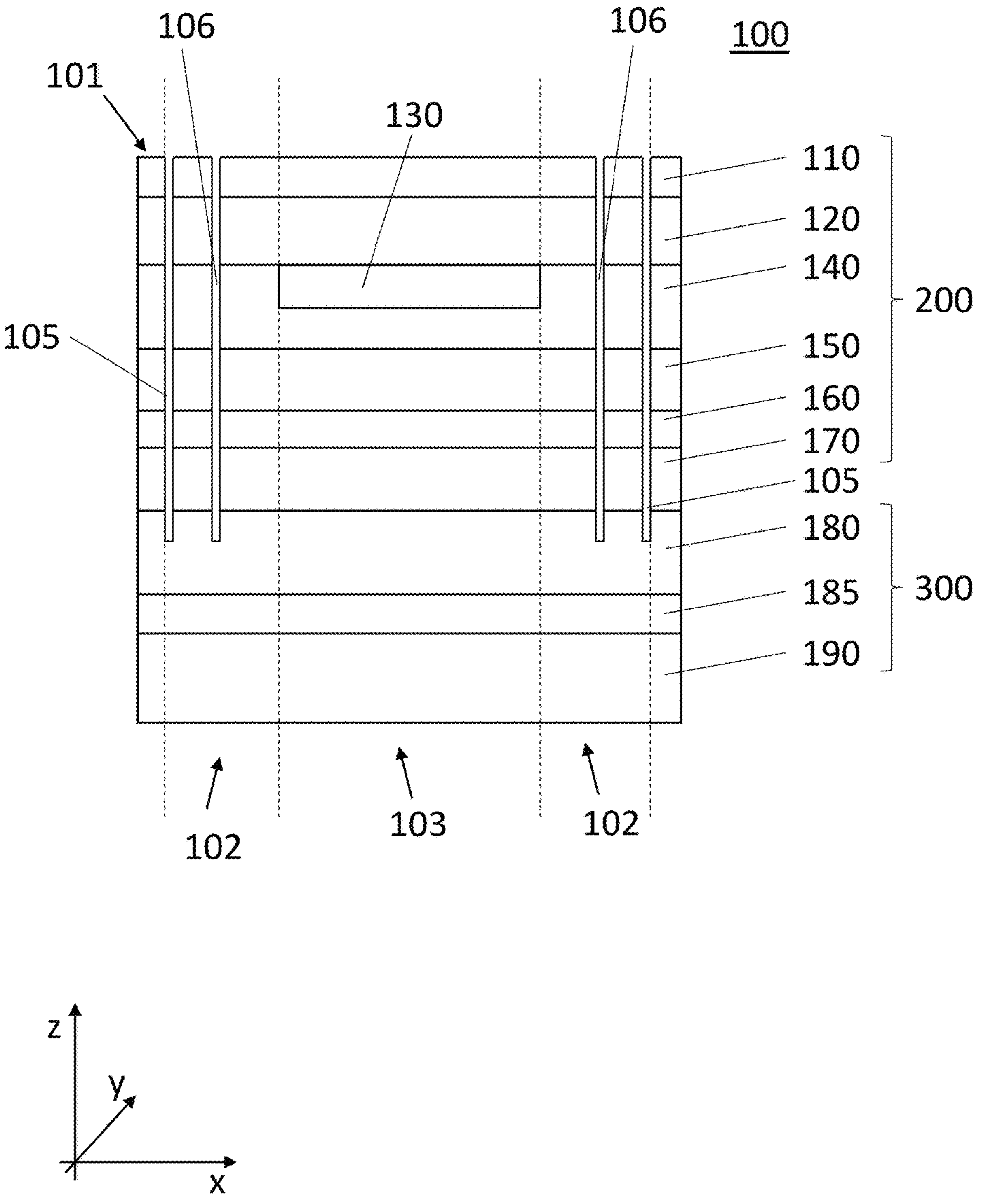

FIG. 5 shows a similar structure of the transfer security element material 100 as shown in FIG. 3 and is described in view thereof. In the embodiment of FIG. 5, the separation protection predetermined breaking points 106 extend completely through the transfer layer. The separation protection predetermined breaking points 106 can extend into the intermediate carrier 300.

Figure 6:
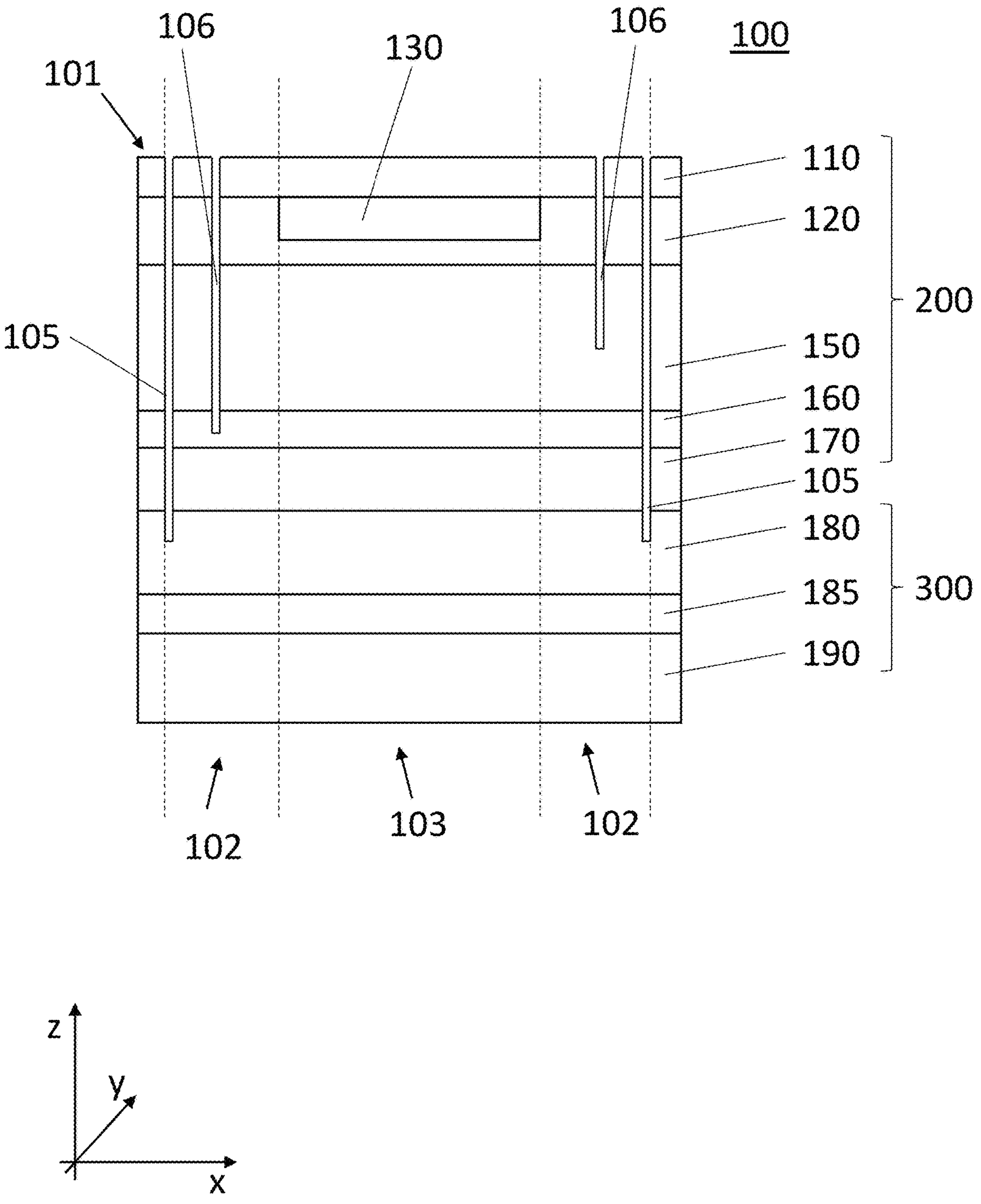

FIG. 6 shows an embodiment of the transfer security element material 100 similar to the form shown in FIG. 3 and described in view thereof, wherein the lamination adhesive layer 140 is not provided. The effect layer 130 can be arranged between the adhesive layer 110 and the lacquer layer 120.

Otherwise, the transfer predetermined breaking point 105 or transfer predetermined breaking points 105 can be designed identically or analogously to those in the above-described embodiments. The separation protection predetermined breaking points 106 can also be designed identically or analogously to those in the above-described embodiments.

In variants of the transfer layer 200 which are not shown in the figures, the decorative layer 130 (and the lacquer layer 120) lie below the plastic film 150. For example, they can be provided in the following order on the intermediate carrier 300: temporary adhesive layer 170, decorative layer 130, lacquer layer 120, plastic film 150, adhesive layer 110. Reference can be made, for example, to WO 2010/031543 A1 with respect to details of this variant or further alternative variants for the partial layers of the transfer layer 200.

It is known that the decorative area—in the variants just mentioned and in the previous figures—can additionally enclose one or more transparent inner areas. The transparent inner area(s) is (are) recognizable to the observer (of the security element) in a top view and/or in a through view, in particular are recognizable in their shape. Inner areas can have any shape, for example, they can be made circular, oval, n-polygonal, in the form of characters, or in the form of strips. Such or similar inner areas are treated as recesses in WO 2010/031543 A1. At least one separation protection inner area predetermined breaking point can optionally be provided in the one transparent inner area or each of the transparent inner areas. The separation protection inner area predetermined breaking point(s) is (are) only located within the transparent inner area, so that this (these) additional predetermined breaking point(s) or the location thereof in the transparent inner area does not impair the optical effect of the decoration (in a top view and/or through view). Since the decorative area encloses the transparent inner area, the optional separation protection inner area predetermined breaking points are clearly spaced apart from the separation protection predetermined breaking points of the edge area, at least by the respective local width of the decorative area. Preferably, multiple transparent inner areas are arranged distributed in the entire decorative area, which each have at least one, in particular precisely one or precisely two separation protection inner area predetermined breaking points.

Figure 7:
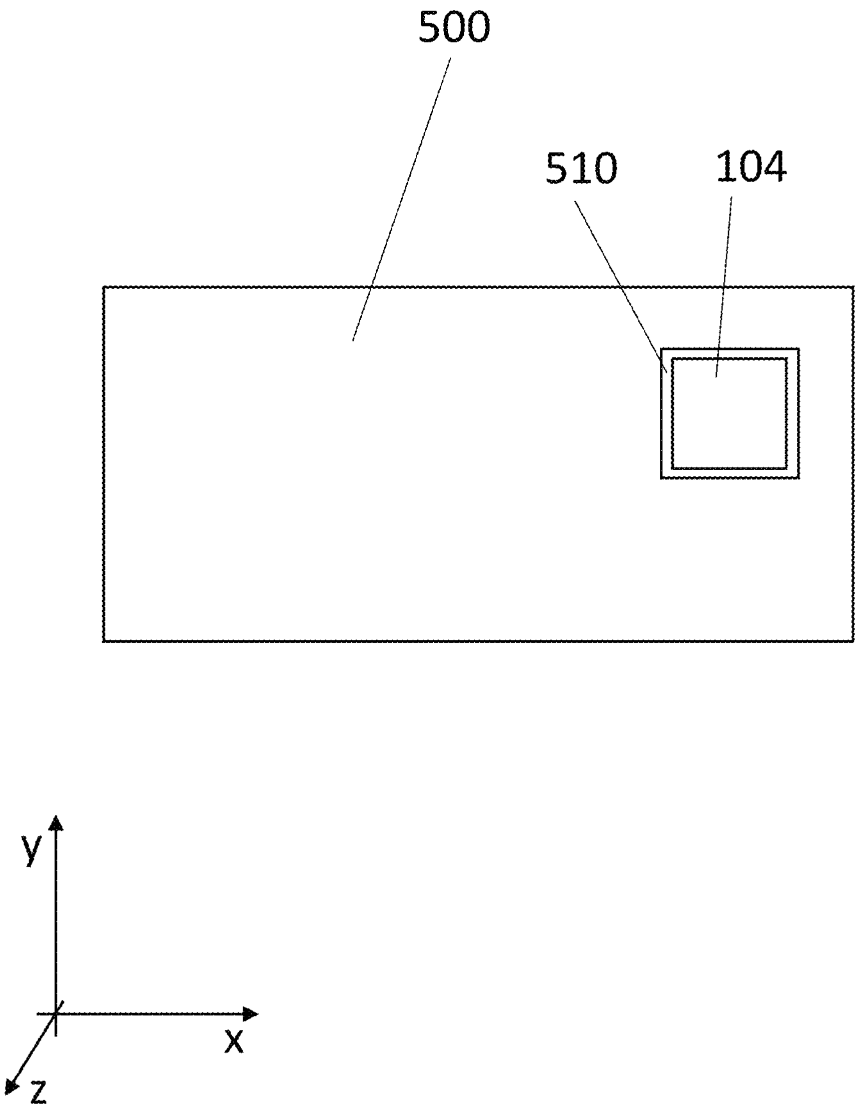
FIG. 7 shows a value document 500 having a security element 104.

FIG. 7 shows a value document 500, such as a banknote, having a security element 104. The security element 104 can be transferred into a section 510 of the value document 500 and adhere there. For this purpose, the adhesive layer 110 of the transfer security element material 100 can be brought into contact with a surface of the value document 500 or the value document substrate.

The invention claimed is:

1. A transfer security element material having an intermediate carrier and a plurality of security elements for value documents, wherein the security elements are arranged on the intermediate carrier so they are detachable from the intermediate carrier, in order to be detached from the intermediate carrier and permanently transferred to a value document substrate upon their transfer, wherein the security elements are present on the intermediate carrier separated from one another at least by transfer predetermined breaking points as separately transferable security elements, wherein the security elements comprise separation protection predetermined breaking points not arranged parallel to the transfer predetermined breaking points, which are to obstruct a separation of the transferred security element from the value document substrate without destroying the security element, the security elements comprise a central decorative area and a transparent edge area surrounding the decorative area, and the separation protection predetermined breaking points are formed in the transparent edge area without extending into the decorative area.

2. The transfer security element material according to claim 1, wherein a distance between at least one of the separation protection predetermined breaking points of the security element and at least one of the transfer predetermined breaking points is less than 100 μm; wherein the distance is measured in a plane defined by the transfer security element material.

3. The transfer security element material according to claim 1, wherein at least one of the separation protection predetermined breaking points extends over less than 92%; and/or has a distance to the decorative area of at least 100 μm; wherein the distance or the width is measured in a plane defined by the transfer security element material.

4. The transfer security element material according to claim 1, wherein an angle between at least one of the separation protection predetermined breaking points and at least one of the transfer predetermined breaking points is in the range 90+/−45°; wherein the angle is in a plane defined by the transfer security element material.

5. The transfer security element material according to claim 1, wherein the transparent edge area has a width of at least 500 μm; wherein the width is in a plane defined by the transfer security element material.

6. The transfer security element material according to claim 1, wherein the transfer security element material comprises an effect layer, wherein the effect layer comprises a metallization and/or a demetallization and/or an arrangement of microreflectors.

7. The transfer security element material according to claim 6, wherein the decorative area comprises the effect layer and/or wherein the transparent edge area does not comprise the effect layer.

8. The transfer security element material according to claim 1, wherein at least one of the separation protection predetermined breaking points is linear, circular, triangular, quadrilateral, or n-polygonal, in a plane defined by the transfer security element material.

9. The transfer security element material according to claim 1, wherein the transfer security element material comprises a transfer layer, which is multilayered, wherein the intermediate carrier is detachably connected to the transfer layer by an adhesive layer.

10. The transfer security element material according to claim 9, wherein the transfer predetermined breaking points extend through the entire transfer layer; and/or wherein the transfer predetermined breaking points extend at most partially through the intermediate carrier.

11. The transfer security element material according to claim 9, wherein the separation protection predetermined breaking points extend through the entire transfer layer; and/or wherein the separation protection predetermined breaking points extend at most partially through the transfer layer; and/or wherein at least two of the separation protection predetermined breaking points extend by different amounts into the transfer layer.

12. A method for producing the transfer security element material according to claim 1, the method comprising the following steps:

providing a transfer security element material precursor; and introducing transfer predetermined breaking points and separation protection predetermined breaking points into the transfer security element material precursor, by which the transfer security element material is obtained.

13. The method according to claim 12, wherein the transfer predetermined breaking points and the separation protection predetermined breaking points are introduced in the same work step, substantially simultaneously, into the transfer security element material precursor; or wherein the transfer predetermined breaking points and the separation protection predetermined breaking points are introduced in different work steps, in work steps spaced apart in time, into the transfer security element material precursor.

14. The use of a transfer security element material and after production according to claim 12, for producing value documents having security elements, wherein one of the security elements is detached from the intermediate carrier and permanently transferred onto a value document substrate.

15. A value document having a security element transferred from a transfer security element material according to claim 1.

* * * * *